United States Patent
Hirano et al.

(10) Patent No.: US 7,450,335 B2
(45) Date of Patent: Nov. 11, 2008

(54) REDUCING READ/WRITE HEAD TRACK MISREGISTRATION

(75) Inventors: Toshiki Hirano, San Jose, CA (US);
Tetsuo Semba, San Jose, CA (US);
Matthew T. White, Mountain View, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 80 days.

(21) Appl. No.: 11/502,069

(22) Filed: Aug. 9, 2006

(65) Prior Publication Data
US 2008/0037155 A1    Feb. 14, 2008

(51) Int. Cl.
G11B 5/596    (2006.01)
(52) U.S. Cl. .................................. 360/77.03
(58) Field of Classification Search ........... 360/77.03, 360/75, 97.02, 69; 369/14; 386/95; 324/207.17
See application file for complete search history.

(56) References Cited

U.S. PATENT DOCUMENTS

| | | | | |
|---|---|---|---|---|
| 4,142,209 A | * | 2/1979 | Hedlund et al. | 386/95 |
| 4,823,205 A | * | 4/1989 | Hannon et al. | 369/14 |
| 4,878,020 A | * | 10/1989 | Karna et al. | 324/207.17 |
| 6,088,185 A | | 7/2000 | Ratliff et al. | |
| 6,359,746 B1 | * | 3/2002 | Kakekado et al. | 360/75 |
| 6,829,115 B2 | | 12/2004 | Lin et al. | |
| 7,012,777 B1 | * | 3/2006 | Hirano et al. | 360/77.03 |
| 7,292,407 B2 | * | 11/2007 | Hirano et al. | 360/97.02 |
| 2003/0117739 A1 | | 6/2003 | Aiello et al. | |
| 2004/0105184 A1 | | 6/2004 | Harada et al. | |

OTHER PUBLICATIONS

"Accumeasure System 5000", *MTI Instruments Inc.* 325 Washington Avenue Extension - Albany New York 12205, (Jun. 1996).

* cited by examiner

Primary Examiner—Fred Tzeng

(57) ABSTRACT

Methods and systems for reducing read/write head track misregistration are described. According to one embodiment, a first signal is received from a first capacitive sensor that faces a surface of a disk associated with a disk drive. A second signal is received from a second capacitive sensor that faces the surface of the disk. A determination is made as to whether the disk is being moved along its axis of rotation or whether the disk is tilting. Read/write head track misregistration is reduced based on the determination of whether the disk drive is being moved along an axis of rotation or whether the disk is tilting.

20 Claims, 25 Drawing Sheets

*(0,0) MODE*

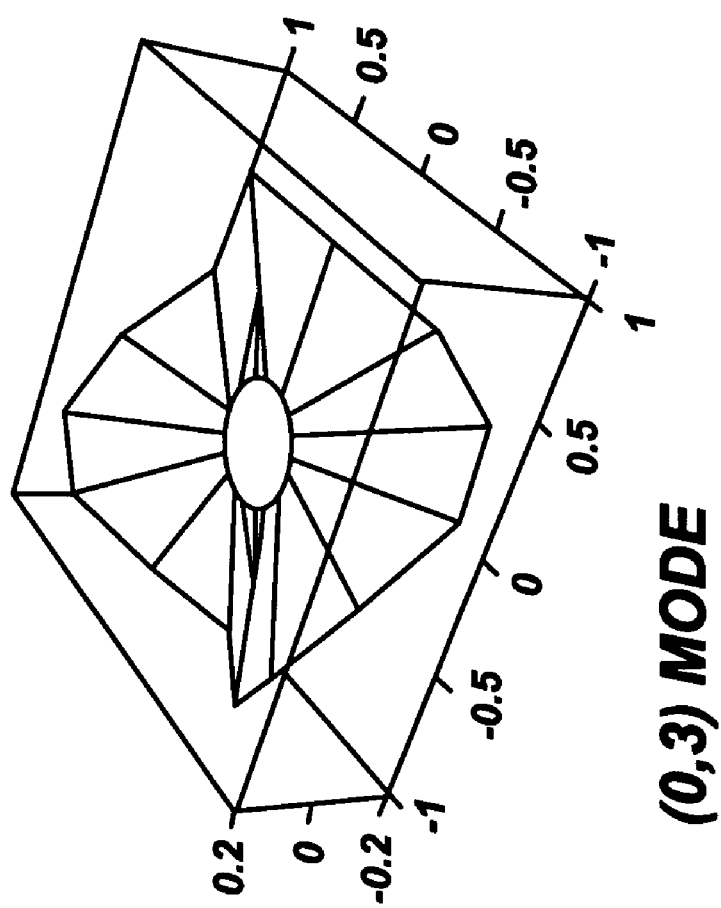
FIG. 7D (0,3) MODE

REDUCING READ/WRITE HEAD TRACK MISREGISTRATION

RELATED APPLICATION SECTION

This application is related to patent application Ser. No. 10/956,908, entitled "Disk Drive with Capacitance Sensing of Disk Vibration and Feedforward Control for Removal of Read/Write Head Track Misregistration," filed Sep. 30, 2004, now issued U.S. Pat. No. 7,012,777, and assigned to the assignee of the present invention, the disclosure of which is hereby incorporated by reference. This application is related to patent application, Ser. No. 10/956,919, entitled "Disk Drive with Support Structure for Disk-Vibration Capacitive Sensors," filed Sep. 30, 2004, now issued U.S. Pat. No. 7,292,407, and assigned to the assignee of the present invention, the disclosure of which is hereby incorporated by reference

BACKGROUND OF THE INVENTION

1. Field of the Invention

This invention relates generally to data recording disk drives, such as magnetic recording hard disk drives, and more specifically to such disk drives that experience track misregistration, for example, due to out-of-plane disk vibration induced by air flow during rotation of the disks.

2. Background of the Invention

Data recording disk drives have a stack of recording disks rotated by a spindle motor, and an actuator that moves the read/write heads across the surfaces of the rotating disks. Each read/write head is formed on an air-bearing slider attached to one end of a flexible suspension. The suspension is attached at its other end to a relatively rigid arm of the actuator and allows the slider to pitch and roll on a bearing of air generated by the rotating disk. The disk drive actuator is typically a rotary voice coil motor (VCM) that moves the actuator arm and the attached suspension and slider generally radially to position the head at the desired track under the control of a servo control system that receives pre-recorded servo position information from the disk. The trend in future disk drives is a continual decrease in the spacing of the concentric data tracks on the disk to increase the data storage density, and a continual increase in the rotational speed of the disk stack to decrease the data transfer time. As storage densities and rotational speeds increase, the ability to position the read/write heads to the proper data tracks and maintain the heads on the data tracks becomes more difficult. As disk-stack rotational speed increases, air-flow turbulence near the perimeter of the disks increases, which causes out-of-plane buffeting or vibration of the disks (sometimes misleadingly called disk "flutter"). These vibrations cause track-misregistration (TMR) of the read/write heads and thus errors in reading data from and writing data to the data tracks.

To address the problem of TMR caused by air-flow-induced disk vibration, thicker disks have been proposed, because disk vibration amplitude reduces as the thickness of the disk increases. However, there is limit on the maximum disk thickness due to the total height limitation of the disk drive. Shrouds located around the disk stack have also been proposed to reduce the effect of air flow turbulence on the disks, but have been shown to reduce disk vibration amplitude by only about 25% or less. Disk vibration damping plates have also been proposed, as described in published U.S. Patent Application US 2003/0072103 A1. The damping plates have planar surfaces parallel to the planar surfaces of the disks and extend between the disks near their perimeter to encourage laminar air flow and thus a reduction in air flow turbulence. However, the damping plates also cause high viscous shear forces on the disks, which require a higher spindle-motor torque, and thus higher power consumption, to maintain the desired high rotational speed.

What is needed is a disk drive with a substantial reduction in disk-vibration-induced TMR of the read/write heads.

SUMMARY OF THE INVENTION

Methods and systems for reducing read/write head track misregistration are described. According to one embodiment, a first signal is received from a first capacitive sensor that faces a surface of a disk associated with a disk drive. A second signal is received from a second capacitive sensor that faces the surface of the disk. A determination is made as to whether the disk is being moved along its axis of rotation or whether the disk is tilting. Read/write head track misregistration is reduced based on the determination of whether the disk drive is being moved along an axis of rotation or whether the disk is tilting.

BRIEF DESCRIPTION OF THE DRAWINGS

FIGS. 7A-7D are representations of the first four resonant vibration mode shapes for a typical disk generated by a finite-element-model (FEM) of the disk.

OVERVIEW

Section 1 provides a detailed description of various embodiments for reducing read/write head track misregistration that result for example from disk vibration. As will become more evident in Section 1, a read/write head can write tracks of data to the surface of a disk and can subsequently be used to read the data from the disk. It is important that the data be written in tracks that are as nearly as possible perfect circles. Disk-stack rotation speed increases air-flow turbulence near the perimeter of the disk, which among other things causes the disk to vibrate. Disk vibration can result in portions of the disk tilting due to vibration, for example, which is depicted as resonant mode vibration shapes in FIGS. 7A-7D. The tilting of the disk may cause the slider, which includes a read/write head, to be incorrectly positioned over the surface of a disk thus resulting in what is commonly referred to as "read/write head track misregistration."

Figure 12A:
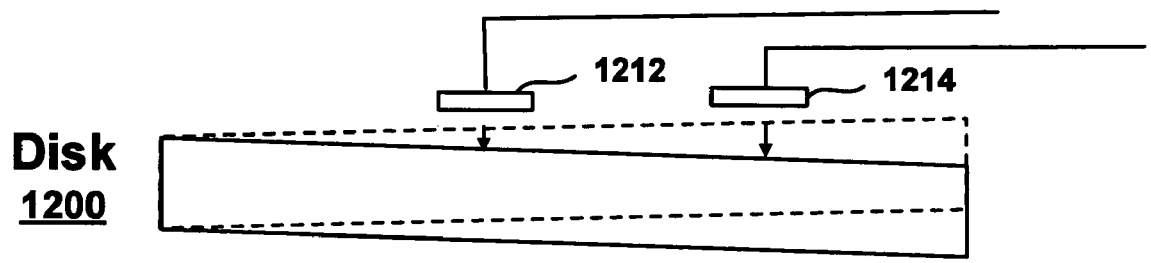
FIG. 12A depicts a disk that is tilting and two sensors for detecting that the disk is tilting, according to one embodiment of the present invention.
Figure 12B:
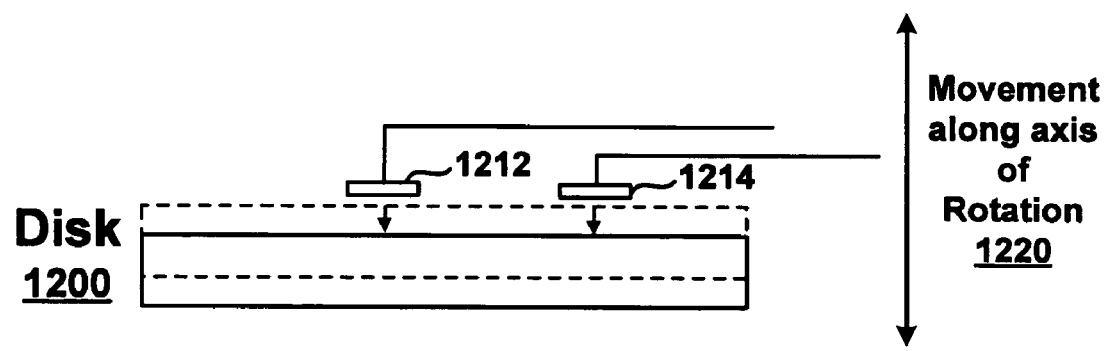
FIG. 12B depicts a disk that is moving along its axis of rotation and two sensors for detecting that the disk is moving along its axis of rotation, according to one embodiment of the present invention.

However, disks may be subjected to movement from other causes. For example, the disk drive may be moved vertically along its axis of rotation (also referred to herein as "vertical movement"). Referring to FIGS. 12A and 12B, according to one embodiment, two capacitive sensors 1212, 1214 which face a surface of a disk 1200 can be used to determine whether the disk 1200 is being moved along its axis of rotation or whether the disk 1200 is tilting. If a disk 1200 is being tilted then the distance between the surface of the disk 1200 and the two sensors 1212, 1214 will be different, as depicted in FIG. 12A. However, if the disk 1200 is being moved 1220 along its axis or rotation then the distance between the surface of the disk 1200 and the two sensors 1212, 1214 will typically be approximately the same, as depicted in FIG. 12B.

Disk tilt as depicted in FIG. 12A is a common cause of read/write head track misregistration since the tilt of the disk 1200 can cause the read/write head to move toward an adjacent track. Movement 1220 along an axis of rotation is not so likely to cause read/write head track misregistration. A system can be used for determining whether a disk is moving along its axis of rotation or whether the disk is tilting, according to one embodiment. The system can use the determination as a part of correcting read/write head track misregistration. For example, by distinguishing between vertical movement and disk tilt, the system for reducing read/write head track misregistration can make corrections when a disk 1200 is tilting as depicted in FIG. 12A and refrain from making corrections when the disk 1200 is being moved vertically as depicted in FIG. 12B. Section 2 provides a detailed description of various embodiments for determining whether a disk drive is being subjected to vertical movement or whether a disk 1200 in the disk drive is tilting.

Section 1: Disk Drive with Capacitance Sensing of Disk Vibration and Feedforward Control for Removal of Read/Write Head Track Misregistration According to one embodiment, a data recording disk drive that addresses the problem of disk-vibration-induced TMR is provided. The disk drive has a plurality of capacitive sensors, each sensor facing a surface of an associated disk, a capacitance sensing circuit for converting the sensed capacitance to a voltage representative of the distance between the sensor and the disk surface, and a feedforward controller that receives the voltage signal. The feedforward controller has a transfer function with gain and phase characteristics designed to match the transfer function from the out-of-plane disk vibration to the position of the read/write head while accounting for the effects of the sensor dynamics and the dynamics of the actuator. The output from the feedforward controller is combined with the output from the disk drive's servo feedback controller so that the effects of disk vibration on the head TMR are removed from the control signal to the actuator.

The vibration of the disk typically includes vibration that is caused by tilt of the disk relative to the axis of rotation and "warpage" of the disk, both of which are "repeatable" in that the axial displacement due to these effects is synchronous with disk rotation. This "repeatable runout" (RRO) component is subtracted out from the signal representative of the distance between the sensor and the disk surface. After the RRO component has been removed, the input to the feedforward controller is representative of the distance between the capacitive sensor and the disk surface due substantially only to non-repeatable runout (NRRO) disk disturbance forces.

The feedforward controller is designed from modeled disk mode shapes and known resonant frequencies because the out-of-plane vibration of the disk at its resonant frequencies is the primary contribution to TMR. A finite-element model (FEM) of the disk is used to generate a mode shape for each resonant vibration mode of interest, and the disk mode shapes are then fit to a polynomial to represent the out-of-plane displacement of the disk as function of radial location. From this function and the measured sensor values, the gain and phase characteristics of the feed forward controller are calculated. Because the desired feedforward controller may vary slightly in gain and phase across the radius of the disk, the feedforward controller may change the gain and/or phase according to the radial head location on the disk.

Figure 1:
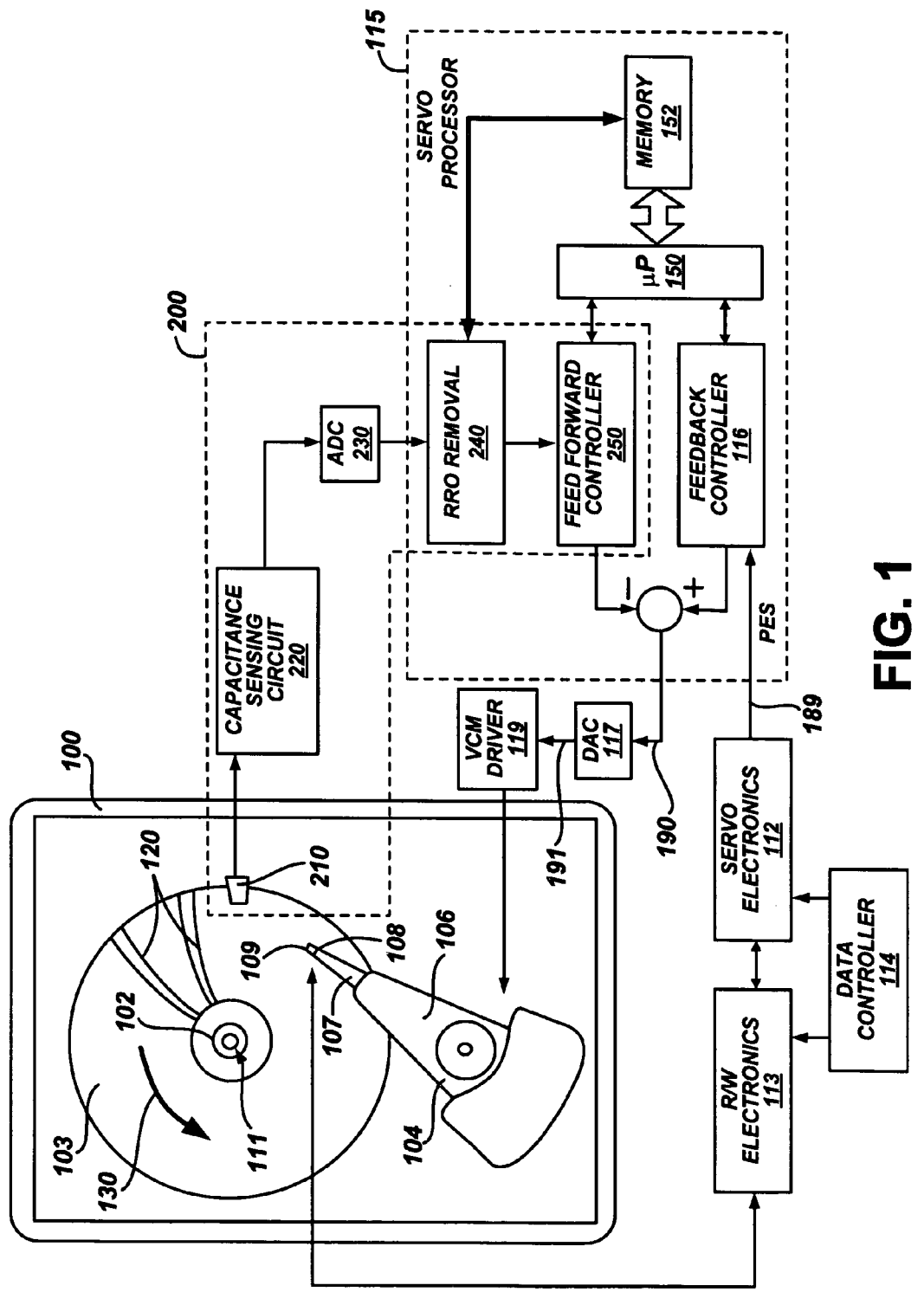
FIG. 1 is a block diagram of a magnetic recording disk drive incorporating the present invention, with the invention being identified as block 200 for ease of explanation.

FIG. 1 is a block diagram of a magnetic recording disk drive incorporating the present invention, with the invention being identified as block 200 for ease of explanation. The disk drive includes a housing 100 that supports a spindle motor 102 and a voice-coil-motor (VCM) actuator 104. At least one magnetic recording disk 103 is mounted on and rotatable by the spindle motor 102. A read/write head 109 reads and/or writes data in the magnetic recording layer of the disk 103.

The recording head 109 may be an inductive read/write head or a combination of an inductive write head with a magnetoresistive read head and is located on the trailing end of slider 108. Slider 108 is supported on the actuator arm 106 by a suspension 107 that enables the slider to "pitch" and "roll" on an air-bearing generated by the rotating disk 103. Typically, there are multiple disks stacked on a hub that is rotated by the spindle motor 102, with a separate slider and recording head associated with each surface of each disk.

Data recording disk 103 has a center of rotation about axis 111 and is rotated in direction 130. Disk 103 includes radially-spaced concentric data tracks. The head must be maintained substantially on the centerline of a data track to correctly read and write data. However, during operation of the disk drive the head experiences track misregistration (TMR) from various disturbance forces. Thus, each data track has a plurality of circumferentially or angularly-spaced servo sectors that contain head positioning information detectable by the head and used in a servo feedback control system to maintain the head on the centerline of the desired data track. The servo sectors in each track are aligned circumferentially with the servo sectors in the other tracks so that they extend across the tracks in a generally radial direction, as represented by two typical servo sectors 120. The data to be written by the head 109 is passed from data controller 114 to the read/write (R/W) electronics 113, and data read by the head is passed from the R/W electronics 113 back to data controller 114. The data controller 114 also provides information to servo electronics 112 for identifying the head number and the track number and data sector number where data is being written or read.

Figure 2:
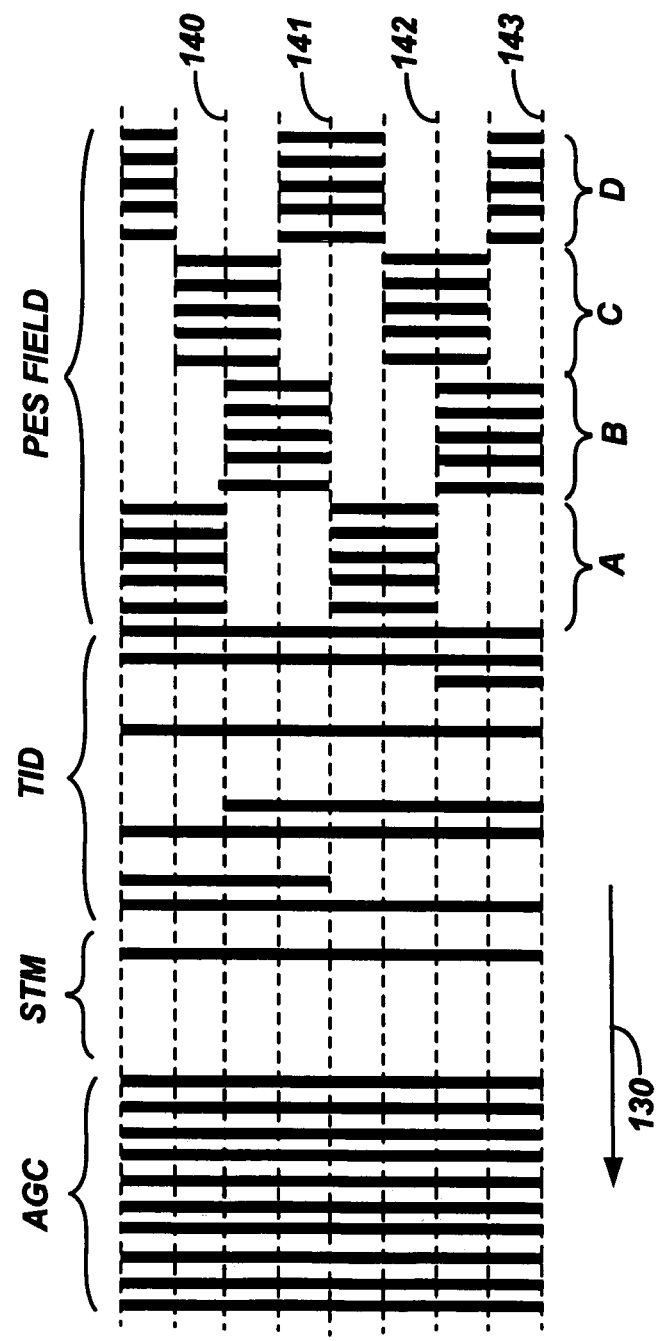
FIG. 2 is a schematic of a conventional servo pattern of the type commonly used in disk drives with sector servo and shows a greatly simplified pattern for clarity with several tracks in one of the servo sectors.

FIG. 2 is a schematic of a conventional servo pattern of the type commonly used in sector servo systems and shows a greatly simplified pattern for clarity with several tracks in one of the servo sectors 120. The servo pattern moves relative to head 109 in the direction shown by arrow 130. The two possible magnetic states of the medium are indicated as black and white regions. The servo pattern is comprised of four distinct fields: an automatic gain control (AGC) field, a servo-timing-mark (STM) field, a track ID (TID) field and a position-error-signal (PES) field depicted as the well-known quad-burst pattern of bursts A-D. The AGC field allows for calibration of the timing and gain parameters for later fields, the servo timing mark STM field serves as a timing reference for reading the subsequent servo information in the TID field and the PES field, and the TID field contains the data track number.

The position error signal (PES) field contains PES bursts A-D that are used to determine the fractional part of the radial position of the head. Each PES burst comprises a series of regularly spaced magnetic transitions. The PES bursts are arranged radially such that a burst of transitions are one track wide and two tracks apart, from centerline to centerline, as shown by centerlines 140, 141, 142, 143. The A and B bursts are the main bursts because when the head is at the track centers the read-back signal amplitudes from A and B are equal. When the head is at the half-track positions the amplitudes from C and D are equal. The PES bursts are offset from their neighbors such that when the head is centered over an even-numbered track (e.g., track with centerline 142) the read-back signal from bursts A and B are equal. As the head moves off-track, the read-back signals from the different bursts increase or decrease and can be decoded to detect the off-track position of the head. While a conventional quad-burst pattern is described, the invention is fully applicable to disk drives that use other servo patterns.

The servo information in the pattern of FIG. 2 is read by the R/W electronics 113 (FIG. 1), and signals are input to the servo electronics 112. The servo electronics 112 decodes the read-back servo signals and provides a digital PES 189 to the servo control processor 115. The servo control processor 115 provides a head position control signal 190 to digital-to-analog converter (DAC) 117 that sends an analog actuator control signal 191 to VCM driver 119 to move the VCM actuator 104 so that the head 109 remains on the track centerline.

The servo control processor 115 includes a microprocessor 150 that uses the PES 189 as input to a control algorithm to generate the head position control signal 190. The control algorithm is a feedback controller 116, which is a set of parameters based on the static and dynamic characteristics of the "plant" being controlled, i.e., the VCM 104. The control algorithm is essentially a matrix multiplication algorithm, and the parameters are coefficients used in the multiplication and stored in memory 152 accessible by the microprocessor 150.

Figure 3:
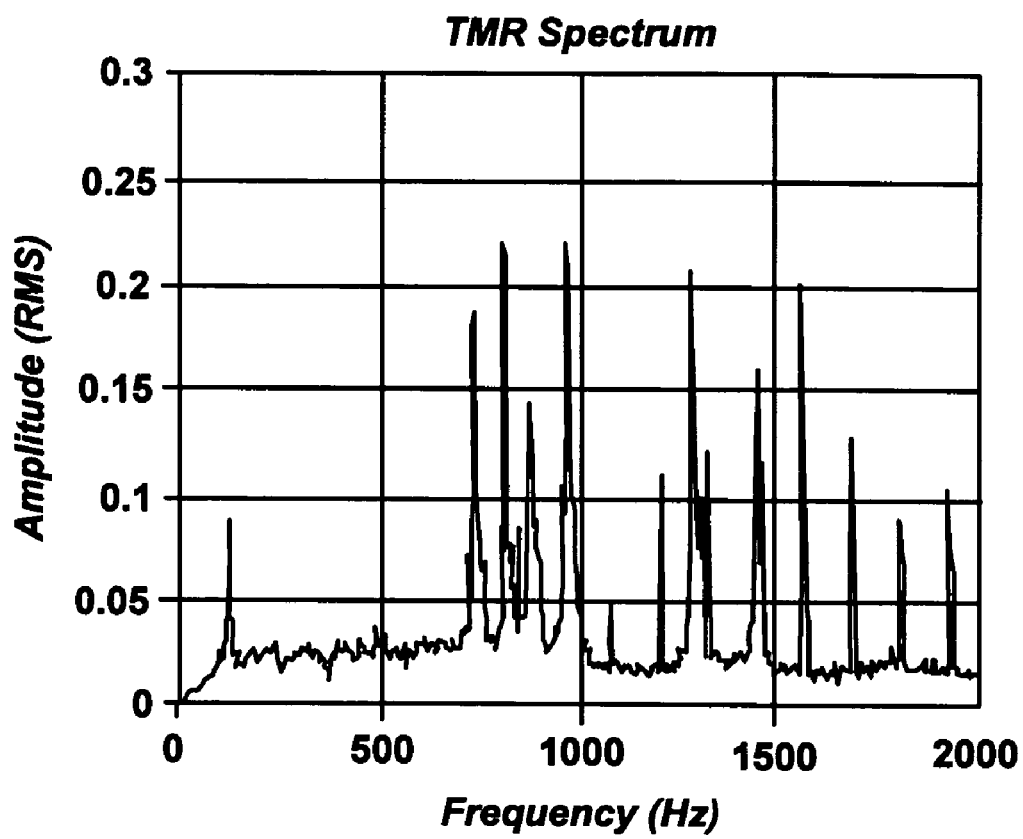
FIG. 3 shows a typical frequency spectrum of track misregistration (TMR) of the read/write head including TMR caused by vibration of the disk at its resonant frequencies.

Out-of-plane or axial disk vibration (sometimes misleadingly referred to as "flutter") is a major source of track-misregistration (TMR) of the read/write head. FIG. 3 shows a typical frequency spectrum of TMR amplitude. The large spikes between 700 and 1500 Hz are due to track error caused by axial disk vibration. For a typical disk drive with 95 mm diameter disks, disk flutter is responsible for approximately 30% of the total TMR. The servo feedback controller can not always correct for head position error caused by disk flutter because the frequency range is too high.

Figure 4:
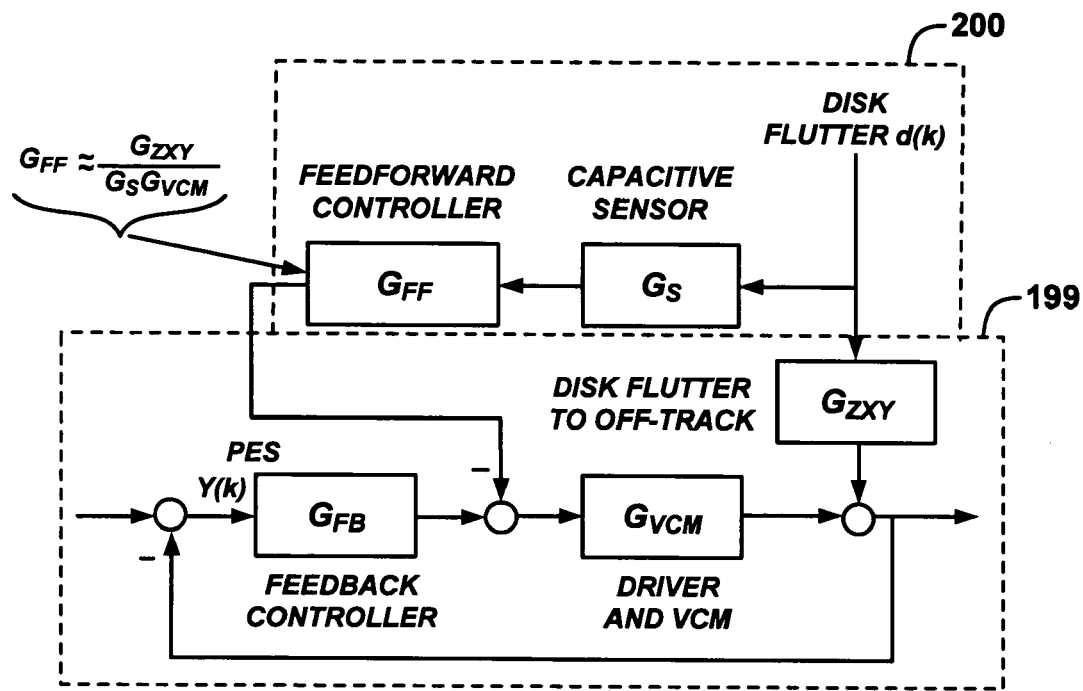
FIG. 4 is a control system diagram of the servo feedback controller loop of the conventional disk drive incorporated with the feedforward controller loop of the present invention.

The present invention addresses the problem of disk-flutter-induced TMR. FIG. 4 is a control system diagram of the feedback controller loop 199 of the disk drive with the feedforward controller loop 200 of the present invention. $G_{ZXY}$ is the transfer function from the external disturbance d(k) of disk flutter to the position of the head. The feedforward controller 200 has a transfer function $G_{FF}$ designed to match this transfer function while accounting for the effects of the sensor dynamics ($G_S$) and the dynamics of the VCM driver and the VCM ($G_{VCM}$). The output from the feedforward controller 200 is combined with the output from the feedback controller 199.

The present invention is generally depicted as block 200 in FIG. 1. The invention includes a capacitive sensor 210 that faces the surface of disk 103, a capacitance sensing circuit 220, an analog-to-digital converter (ADC) 230, means 240 for removal of the disk vibration component that is synchronous with disk rotation, also called repeatable runout (RRO), and a feedforward controller 250.

As shown in FIG. 1, the exemplary capacitive sensor 210 has a generally trapezoidal shape and is located near the slider 108 but outside the outer extent of the generally radial path of the slider 108. The capacitive sensor 210 can be a commercially available capacitance probe, such as Model Series 5000 available from ADE Technologies. However, to reduce cost the capacitive sensor 210 can be a metal plate with a surface area designed so that it is large enough to provide a capacitive signal but small enough so that it is detecting substantially only "local" axial displacement of the disk, i.e., displacement near the slider 108.

Figure 5:
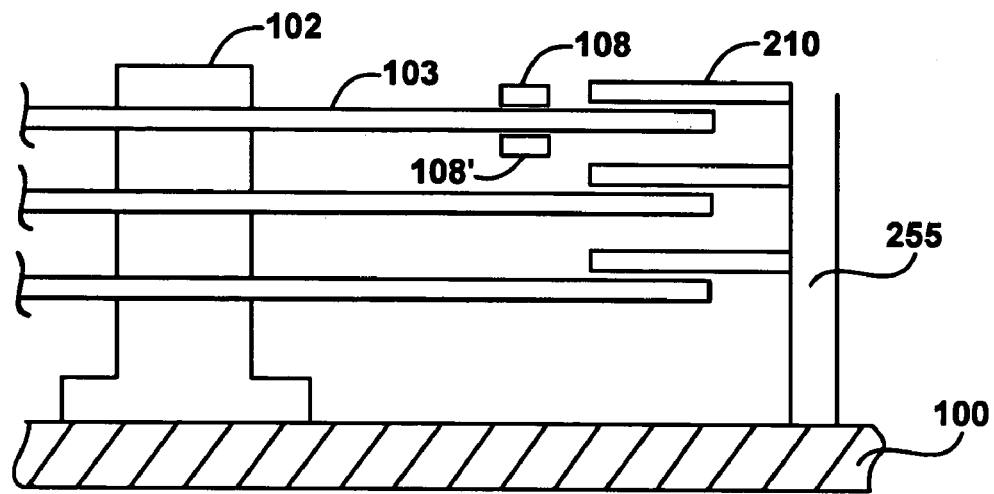
FIG. 5 is a side view showing the spindle motor mounted to disk drive housing and supporting a plurality of disks and the capacitive sensors associated with the disks.

FIG. 5 is a side view showing the spindle motor 102 mounted to disk drive housing 100 and supporting a plurality of disks, including disk 103 (three disks are shown in FIG. 5). A capacitive sensor is associated with each disk, such as sensor 210 facing the top surface of disk 103. The spacing between the sensor 210 and the top surface of disk 103 is in the range of about 0.1 mm to 0.4 mm, a spacing selected to be close enough for adequate sensor sensitivity yet far enough to avoid contact between the sensor and the disk during an external shock to the disk drive. The sensors are attached to a support post 255 that is mounted to the housing 100. Patent application Ser. No. 10/956,919, filed Sep. 30, 2004 and titled "DISK DRIVE WITH SUPPORT STRUCTURE FOR DISK-VIBRATION CAPACITIVE SENSORS," now issued U.S. Pat. No. 7,292,407, describes more detailed support structures for the capacitive sensors.

During rotation of the spindle motor 102, the disks will experience vibration, typically caused by airflow disturbances, which will cause TMR of the head supported on slider 108 on the top surface of disk 103, as well as on head 108' on the bottom surface of disk 103. During vibration of the disk the distance between the sensor and the disk surface, such as between sensor 210 and the top surface of disk 103, will change and be detected as a change in capacitance. The capacitance is inversely proportional to the gap or distance between the sensor and the disk surface by the relationship $C=(\epsilon A)/g$, where $\epsilon$ is the permittivity, A is the area of the sensor plate and g is the gap. Thus, if the capacitance change $\Delta C$ of sensor 210 from a reference value established when the disk drive is not operating is negative, then the gap between sensor 210 and the top surface of disk 103 has increased by some value $\Delta g$, indicating that the top surface of disk 103 has tilted so as to have a "convex" shape. Also, this indicates that the bottom surface of disk 103 on which slider 108' is located has tilted so as to have a "concave" shape. Thus when the capacitive sensor signal is being used in the feedforward control of the head located on the surface of the disk opposite to the disk surface faced by the sensor, the signal polarity needs to be switched. Of course, two capacitive sensors could be used for each disk, with a sensor for each of the two disk surfaces. Two capacitive sensors could also be used for each disk such that both sensor signals are used differentially for each of the two disk surfaces.

Figure 6:
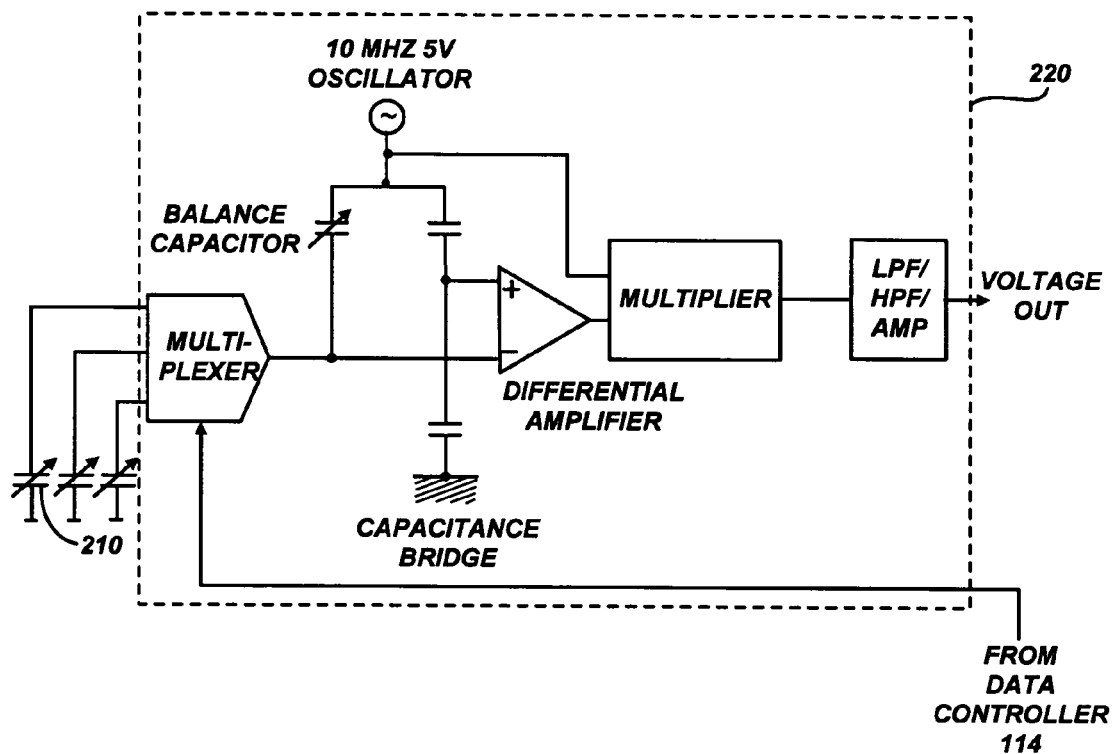
FIG. 6 is a schematic of a conventional capacitance sensing circuit.

FIG. 6 is a schematic of an exemplary capacitance sensing circuit 220. The outputs of three capacitive sensors, including sensor 210, are input to a multiplexer. The disk drive controller 114 (FIG. 1), which has selected the head that is reading or writing, provides a signal to the multiplexer so that the sensor associated with the disk on which the selected head is reading or writing is selected as the input to the sensing circuit 220. The circuit is operated at 10 MHz and the signal from the selected sensor is input to a capacitance bridge. Signals outside the range of interest are removed by a high pass filter (HPF) and a low pass filter (LPF), and the signal is amplified and output as a voltage. The voltage signal out of circuit 220 represents the gap or distance between the selected sensor and its associated disk surface.

Referring again to FIG. 1, the signal from capacitance sensing circuit 220 is converted to digital by ADC 230. The RRO removal means 240 and feedforward controller 250 are shown as incorporated in servo processor 115. In the preferred embodiment these functions are performed in software as part of algorithms run by the microprocessor 150. The capacitive sensor signal usually has relatively large RRO because the vibration of the disk includes vibration that is caused by tilt of the disk relative to the axis of rotation and "warpage" of the disk, both of which are "repeatable" in that the axial displacement due to these effects is synchronous with disk rotation. Thus each digital value output by ADC 230 includes a RRO component that can be subtracted out. After the RRO component has been removed, the digital value input to the feedforward controller 250 is representative of the distance between the capacitive sensor and the disk surface due substantially only to non-repeatable disk disturbance forces.

The RRO removal algorithm may be a "subtraction-type" algorithm that calculates the RRO over a number of disk revolutions and then subtracts the computed RRO component. The capacitive sensor signal can be measured at a discrete number of angular locations on the disk, e.g., at each servo sector, and the average values computed. The averaged values are then stored in memory 152 as a table of servo sector numbers and associated RRO component values. The microprocessor 150 then recalls the appropriate RRO component value and subtracts it from the sensor digital value prior to operating the feedforward controller algorithm. The averages can also be calculated in real-time as a moving average, with or without memory.

The feedforward controller 250 is a frequency-response-matching controller that substantially matches the frequency response of disk flutter to TMR, while accounting for the effects of the sensor dynamics and the dynamics of the VCM driver and the VCM. The feedforward controller 250 output has opposite sign of the disturbance effects, as shown in FIG. 1.

Figure 7A:
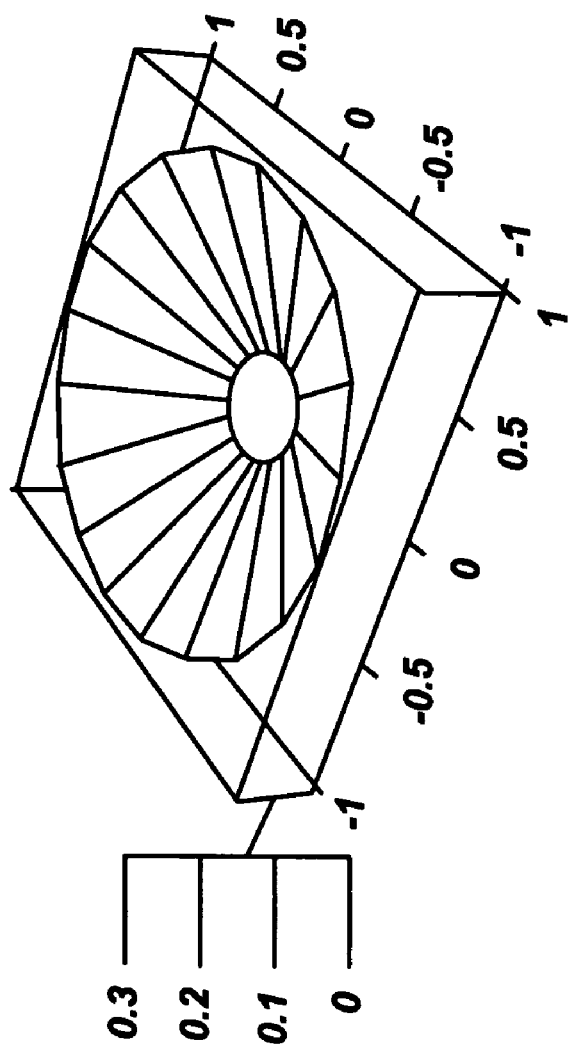
Figure 7B:
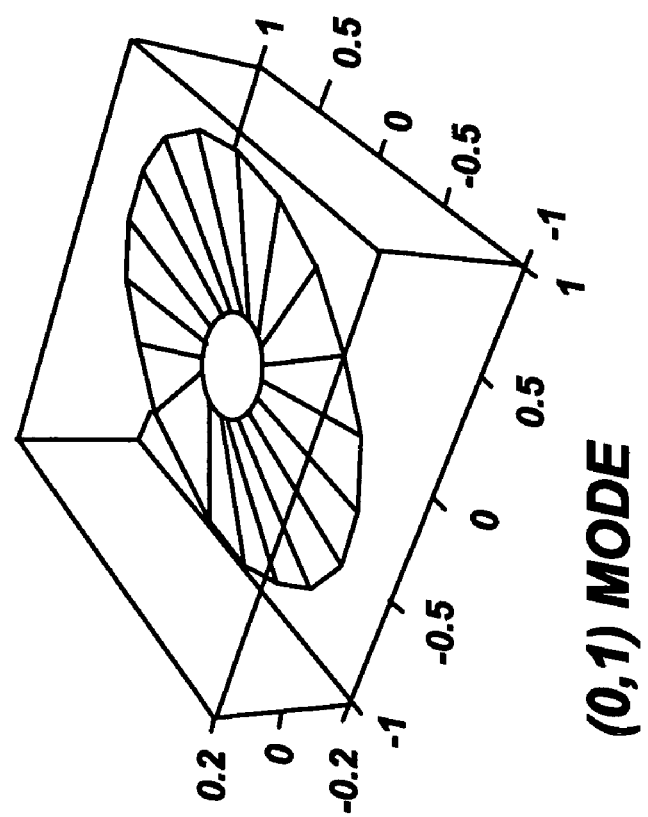
Figure 7C:
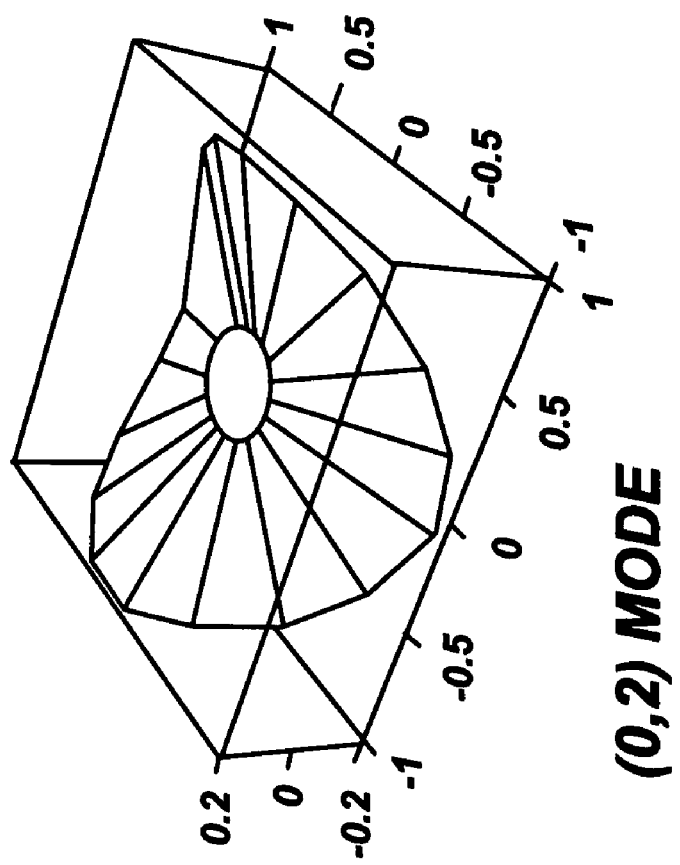
Figure 8:
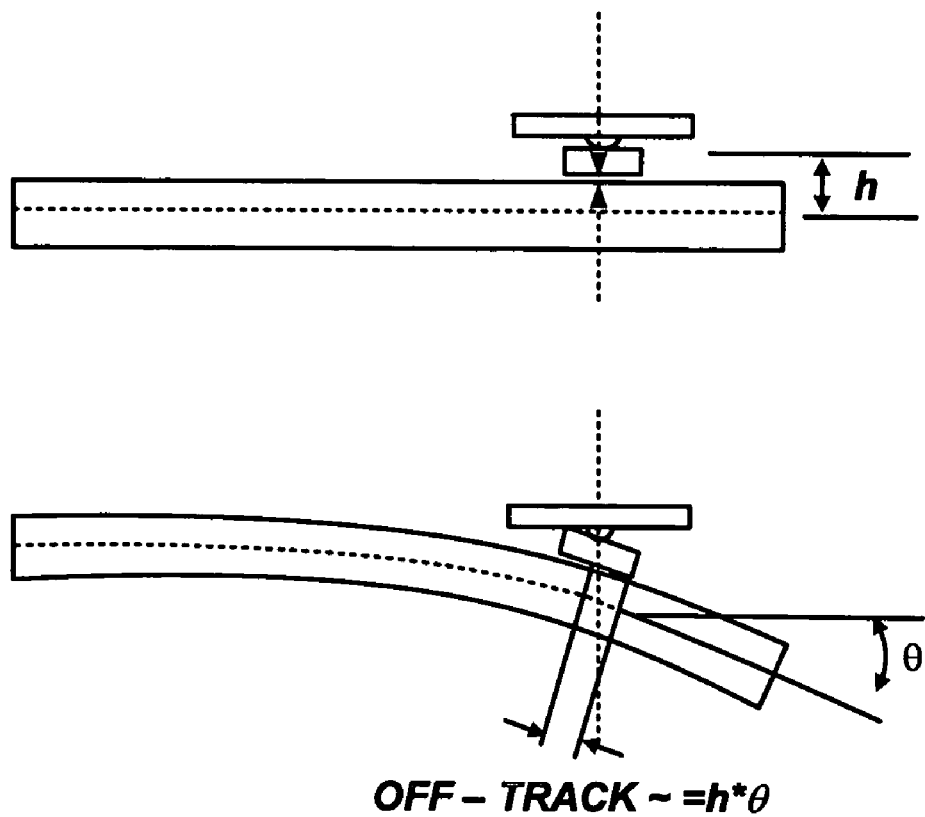
FIG. 8 is a schematic illustrating off-track position of the slider related to the product of the tilt angle $\Theta(r)$ and the distance h from the slider pivot point to the center of the disk's thickness.
Figure 9:
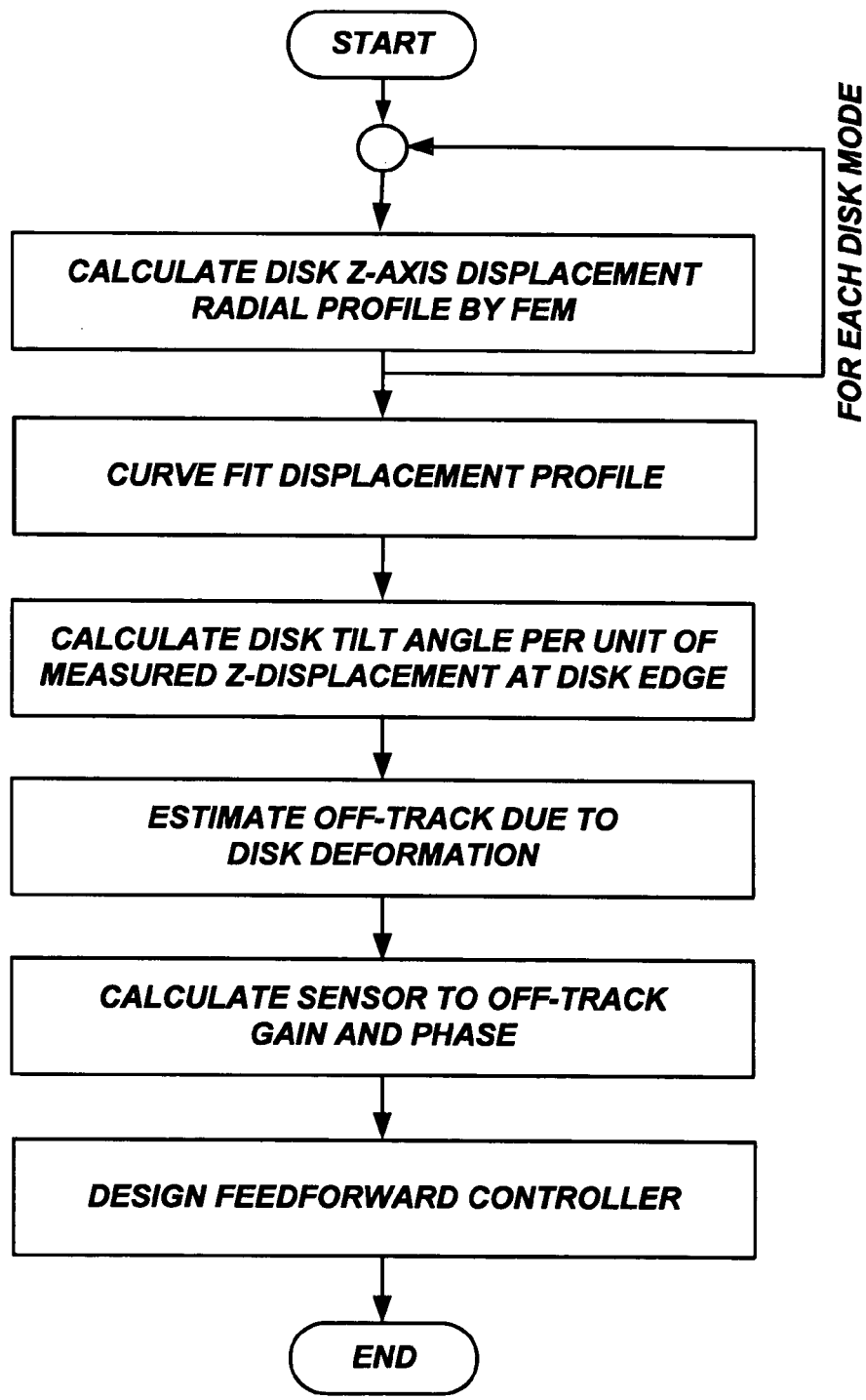
FIG. 9 is a flow chart that shows one possible way to determine the effects of the disk motion on the TMR and design an appropriate feedforward controller.

The method for designing the feedforward controller 250 will be explained with reference to FIGS. 7-9. The vibration of the disk at its resonant frequencies during operation of the disk drive contributes to TMR. FIGS. 7A-7D are computer generated representations of the first four resonant mode shapes for a typical disk. The TMR occurs primarily when the z-axis motion of the disk, i.e., the axial or out-of-plane motion, results in tilting of the disk surface, which in turn affects the position of the slider relative to the data track. FIG. 8 is a schematic illustrating off-track position of the slider related to the product of the tilt angle $\Theta(r)$ and the distance h from the slider pivot point to the center of the disk's thickness. To compensate for these effects, the disk mode shapes and resonant frequencies must be considered when designing the feedforward controller. One possible way to determine these effects and generate an appropriate feedforward controller is described in the following paragraphs and summarized in the flow chart of FIG. 9.

First, a finite-element model (FEM) of the disk is generated using the known material properties and geometry of the disk. For each mode of interest, a mode shape is generated from the FEM at the circumferential location of the capacitive sensor. Then the radial disk mode shape is fit to a polynomial to represent the z-axis displacement of the disk as function of the radial location z(r). Then the tilt angle $\Theta(r)$ is calculated at each radial location as the derivative of the z-axis motion with respect to the radius according to the relationship $\Theta(r)=dz(r)/dr.$ Let $\Delta z_{calc}$ be the z-axis disk displacement at the location of the capacitive sensor as calculated by the FEM. Then the normalized disk tilt angle is calculated as $\Theta_{norm}(r)=\Theta(r)/\Delta z_{calc}.$ The off-track motion $\Delta x(r)$ at each radial location due to the disk mode is then approximated by the product of the tilt angle $\Theta(r)$ and the distance h from the slider pivot point to the center of the disk's thickness as $\Delta x(r)=h\Theta(r).$ This is calculated from the measured sensor signal $\Delta z_{meas}$ as $\Delta x(r)=h\Theta_{norm}(r)\Delta z_{meas}.$ The magnitude of the transfer function from the sensor to the TMR at the disk mode frequency is then calculated as $M(r)=\Delta x(r)/\Delta z_{meas}.$ Let $\phi$ be the angle between the center of the capacitive sensor and the location of the read/write head. Let i be the mode number, i.e. the number of nodal diameters of the mode, where the mode number is positive for forward-traveling modes and negative for backward-traveling modes. Then the phase of the transfer function from the sensor to the TMR at the disk mode frequency is calculated as $\Phi(r)=i\phi.$ Next, the feedforward controller magnitude and phase is calculated for each mode resonant frequency as described above. Weighting of each mode may be performed using such criteria as the magnitude of the TMR at each mode resonant frequency. A realizable filter is synthesized to best fit the desired feedforward controller magnitude and phase, using a technique such as least-squares.

The desired feedforward controller magnitude and phase can also be determined through measurements of the hard disk drive and then synthesized using standard controller synthesis techniques. Synthesizing such frequency responses often involves approximations to deal with unstable zeros that cannot be inverted. Additional frequency response synthesis techniques are available to deal with this issue.

Figure 10:
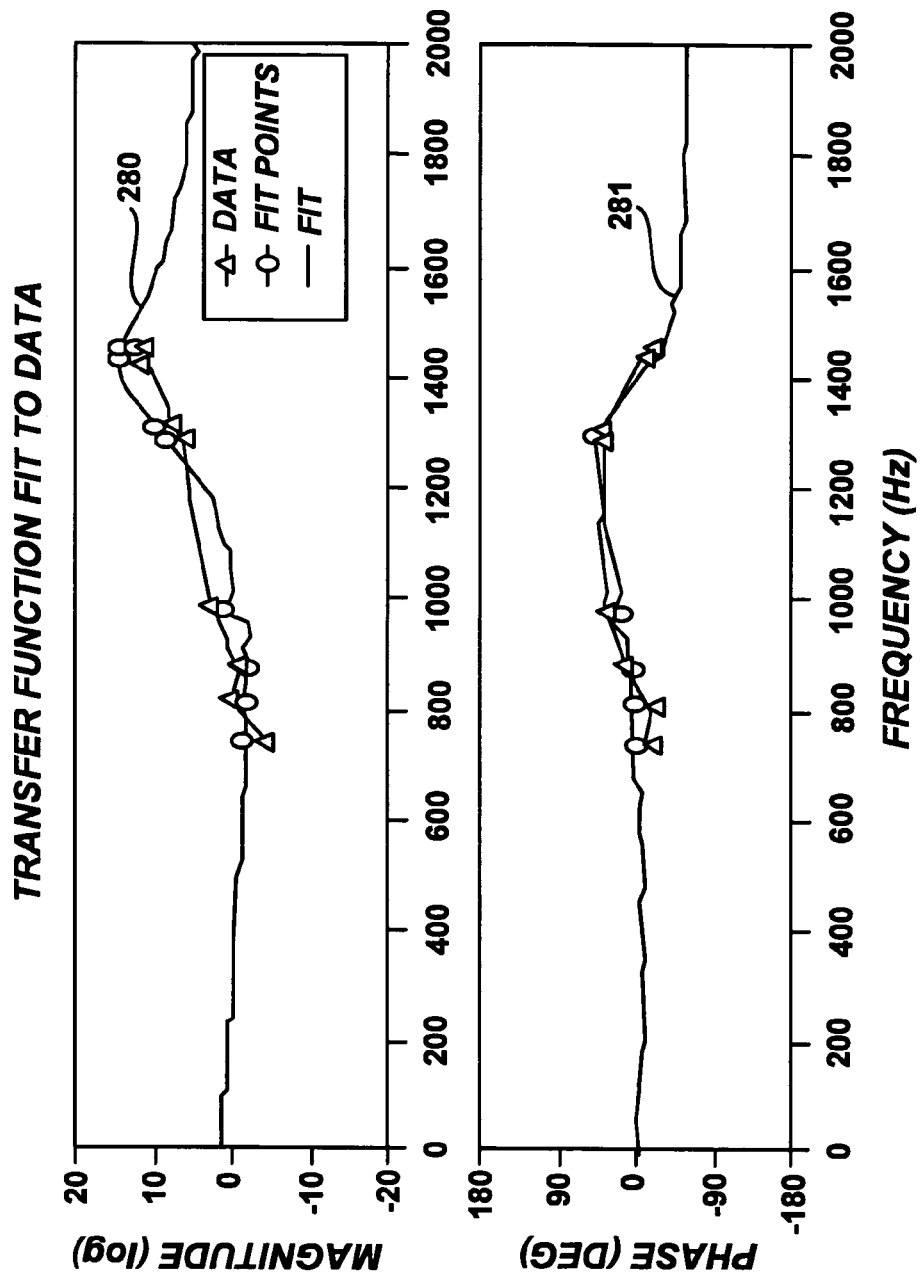
FIG. 10 shows the gain and phase characteristics for the desired feedforward controller based on actual measured data at the disk resonant frequencies.

FIG. 10 shows the gain 280 and phase 281 characteristics for the desired feedforward controller based on actual measured data at the disk resonant frequencies (triangles). The solid lines 280, 281 represent the fit to that data. It is important to match the gain and phase of the desired frequency response to achieve maximum reduction of the disk flutter effects. Because the desired feedforward controller may vary slightly in gain and phase across the radius of the disk, the feedforward controller may change the gain and/or phase according to the radial head location on the disk. The gain needs to be higher when the head is at outer-diameter location than when the head is at the inner-diameter location. Experimental measurements have shown that the gain should increase generally linearly with disk radius. The gain and phase can be selected from a table stored in memory 152 (FIG. 1) of gain and phase values and associated disk radial locations or annular disk zones, with the radial location of the head being available from the TID provided to the servo processor 115 by servo electronics 112 (FIG. 1).

Figure 11:
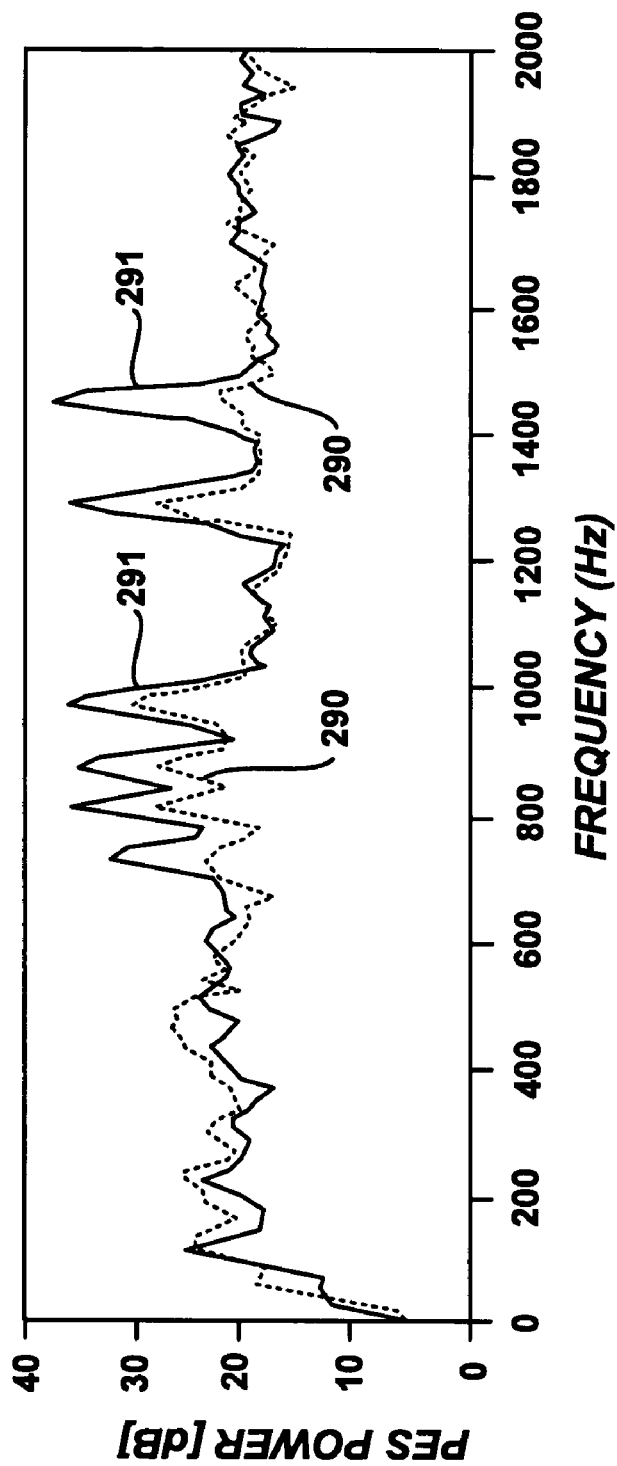
FIG. 11 shows the PES power spectrum in the frequency range of interest with and without the feedforward control of the present invention.

FIG. 11 shows an example of the effectiveness of the invention. FIG. 11 shows the PES power spectrum in the frequency range of interest with (line 290) and without (line 291) the feedforward control. The PES power spectrum with feedforward control is significantly lower than the spectrum without feedforward control at the disk flutter frequencies. The feedforward control reduced the non-repeatable runout (NRRO) by approximately 26%.

Section 2: Reducing Read/Write Head Track Misregistration

Figure 13:
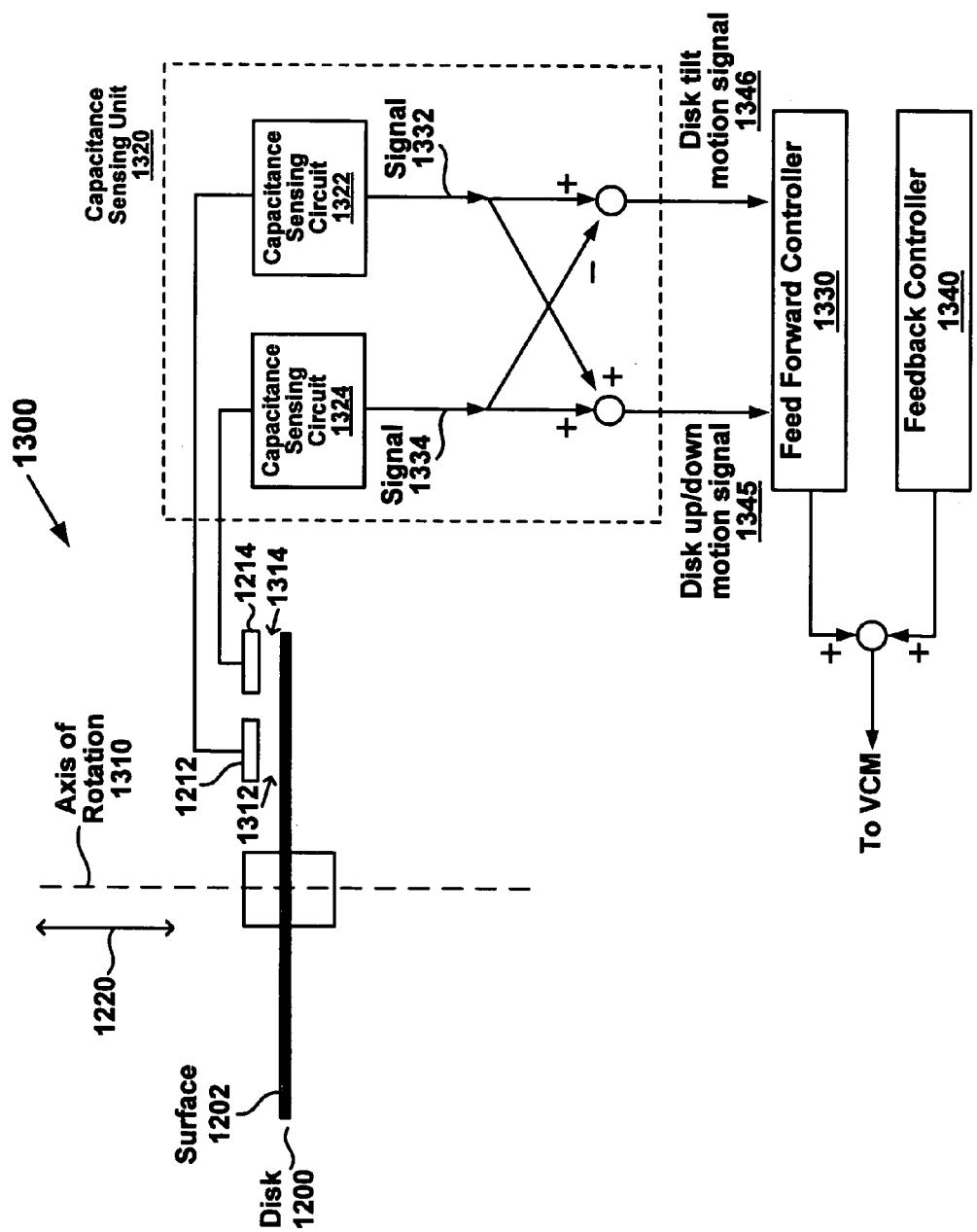
FIG. 13 depicts a diagram of a system for reducing read/write head track misregistration, according to one embodiment

FIG. 13 depicts a diagram of a system 1300 for reducing read/write head track misregistration, according to one embodiment. The system 1300 includes two capacitive sensors 1212, 1214, a capacitance sensing circuit 1320, a feed forward controller 1330, and a feedback controller 1340. The sensors 1212, 1214 face the surface 1202 of a disk 1200 that could be associated with a disk drive. The sensors 1212, 1214 enable determining distances 1312, 1314 between the respective sensors 1212, 1214 and the surface 1202 of the disk 1200. For example, sensor 1212 enables determining distance 1312 between sensor 1212 and the disk 1200's surface 1202 and sensor 1214 enables determining distance 1314 between sensor 1214 and the disk 1200's surface 1202. The capacitance sensing unit 1320 is coupled to the sensors 1212, 1214. The capacitance sensing unit 1320 has two capacitance sensing circuits 1322, 1324. Each of capacitance sensing circuits 1322, 1324 are connected to one sensor. For example, circuit 1324 is connected to sensor 1214 and circuit 1322 is connected to sensor 1212. The output from each capacitance sensing circuit 1324, 1322 is a signal 1334, 1332 that represents a distance 1314, 1312 between the associated sensor 1212, 1214 and the disk 1200's surface 1202. For example, signal 1332 represents distance 1312 and signal 1334 represents distance 1314. The sum 1345 of the two sensing signals 1334, 1332 represents the movement of disk 1200 along its axis of rotation 1310, whereas the difference 1346 between the two sensing signals 1334, 1332 represents tilting movement of the disk 1200.

According to one embodiment, the feed forward controller 1330 is similar to the feed forward controller 250 depicted in FIG. 1 except, for example, that the feed forward controller 1330 can receive two signals from capacitance sensing unit 1320. According to one embodiment, the feedback controller 1340 is similar to the feedback controller 116 depicted in FIG. 1.

Figure 14:
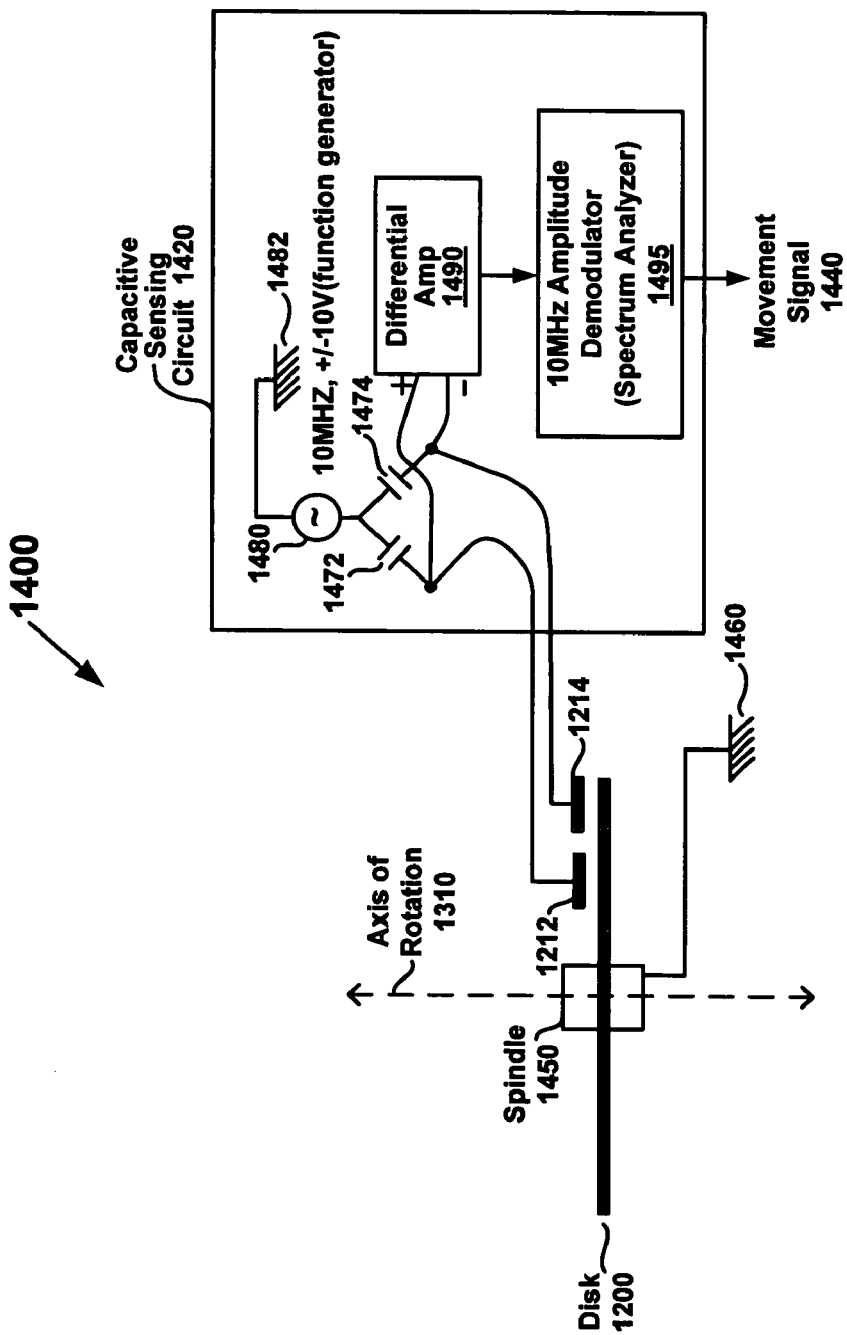
FIG. 14 depicts a block diagram of a portion of a disk drive and a system for reducing read/write head track misregistration, according to another embodiment.

FIG. 14 depicts a block diagram of a portion 1400 of a disk drive and a capacitive sensing unit, according to another embodiment. According to one embodiment, the capacitance sensing unit 1420 in this example only outputs a signal that represents tilt motion of the disk. The portion of the disk drive 1400 depicted in FIG. 14 includes a disk 1200, a spindle 1450, two sensors 1212, 1214 and a capacitance sensing circuit 1420. The spindle 1450 is grounded 1460. The capacitance sensing circuit 1420, according to one embodiment, includes two capacitors 1472, 1474, a bridge circuit 1480, a ground 1482, a differential amplifier 1490, and an amplitude demodulator 1495. The sensors 1212, 1214 detect the distances respectively between them 1212, 1214 and the disk 1200's surface for example by measuring capacitance. According to one embodiment, a voltage that is plus or minus 10 volts of 10 megahertz (MHz) is applied to the bridge circuit 1480.

The differential amplifier 1490 can be used for determining the difference between the two distances. For example, the sensors 1212, 1214 and the capacitors 1472, 1474 can be used as a part of measuring the distances by using the difference of the capacitances measured by the sensors 1212, 1214. The differences in the capacitances is proportional the tilt of the disk 1200's surface, according to one embodiment. For example, the capacitance varies depending on the length of a distance between a sensor 1212, 1214 and the disk 1200's surface. The bridge circuit 1480 can detect the difference in the distances.

The differential amplifier 1490 can indicate the difference in the respective capacitances. The strength of the amplitude output of the differential amplifier 1490 depends on the difference between the capacitances, according to one embodiment. When the disk 1200 is being moved along its axis of rotation 1310, the capacitances of the two capacitors change in the same way, resulting in no change to the differential signal. When the disk 1200 is tilting, the capacitances of the two capacitors change differently, resulting in a change in the differential signal. In other words, according to one embodiment, the differential signal amplitude is proportional to the tilt of the disk 1200, but independent of the disk 1200's motion along its axis of rotation 1310. According to one embodiment, the amplitude demodulator 1495 is a 10 MHz amplitude demodulator. The 10 MHz amplitude demodulator can receive the amplitude from the differential amplifier 1495 and can generate a movement signal representative of the tilting movement of the disk 1200.

Figure 15:
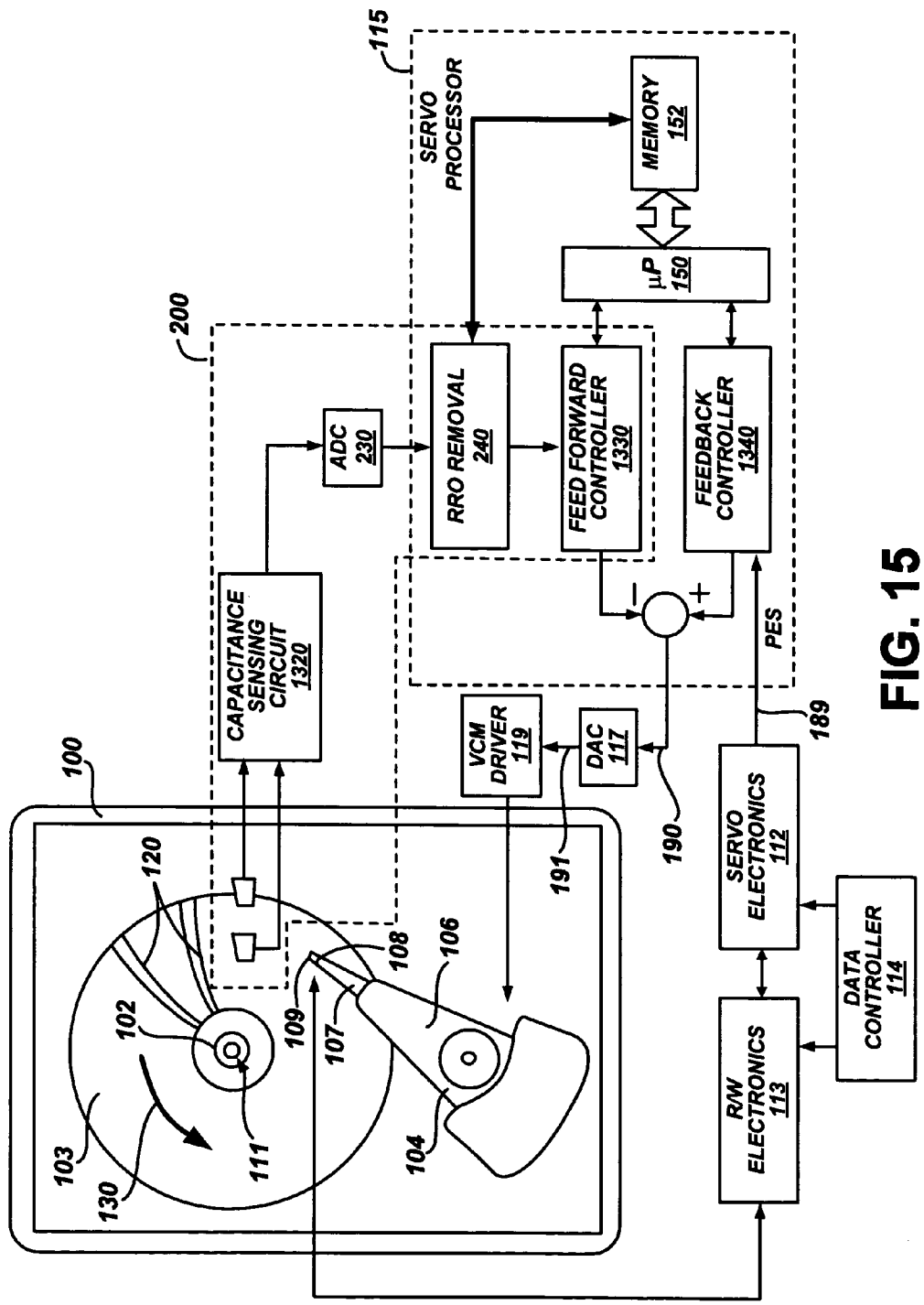
FIG. 15 depicts a disk drive that is capable of determining whether a disk is moving along its axis of rotation or whether the disk is tilting, according to one embodiment.

FIG. 15 depicts a disk drive that is capable of determining whether a disk 103 is moving along its axis of rotation or whether the disk 103 is tilting, according to one embodiment. The disk drive includes a system 1300 for reducing read/write head track misregistration. Refer to the description of FIG. 13 for details on the system 1300 for reducing read/write head track misregistration. Refer to the description of FIG. 1 for details on the other components of the disk drive.

Figure 16A:
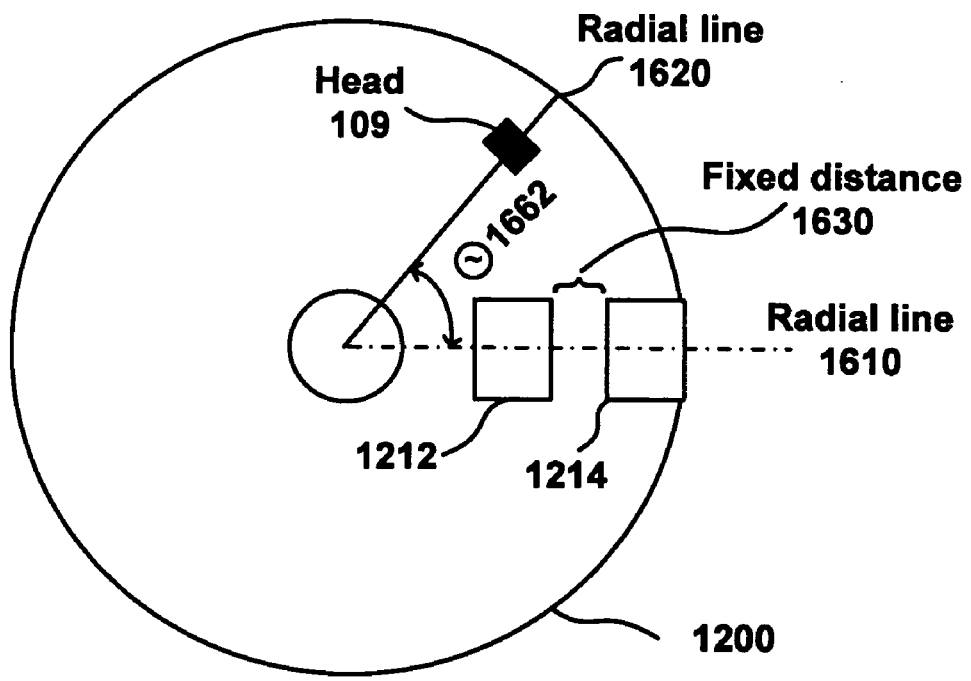
FIGS. 16A and 16B depict sensors configured with respect to a disk, according to one embodiment.
Figure 16B:
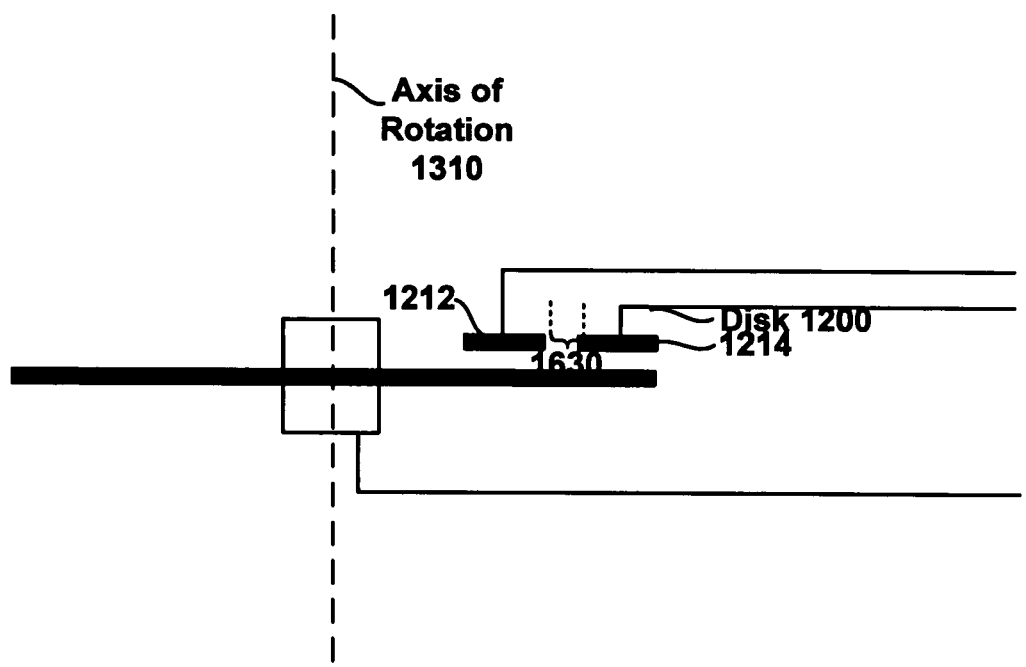
Figure 17:
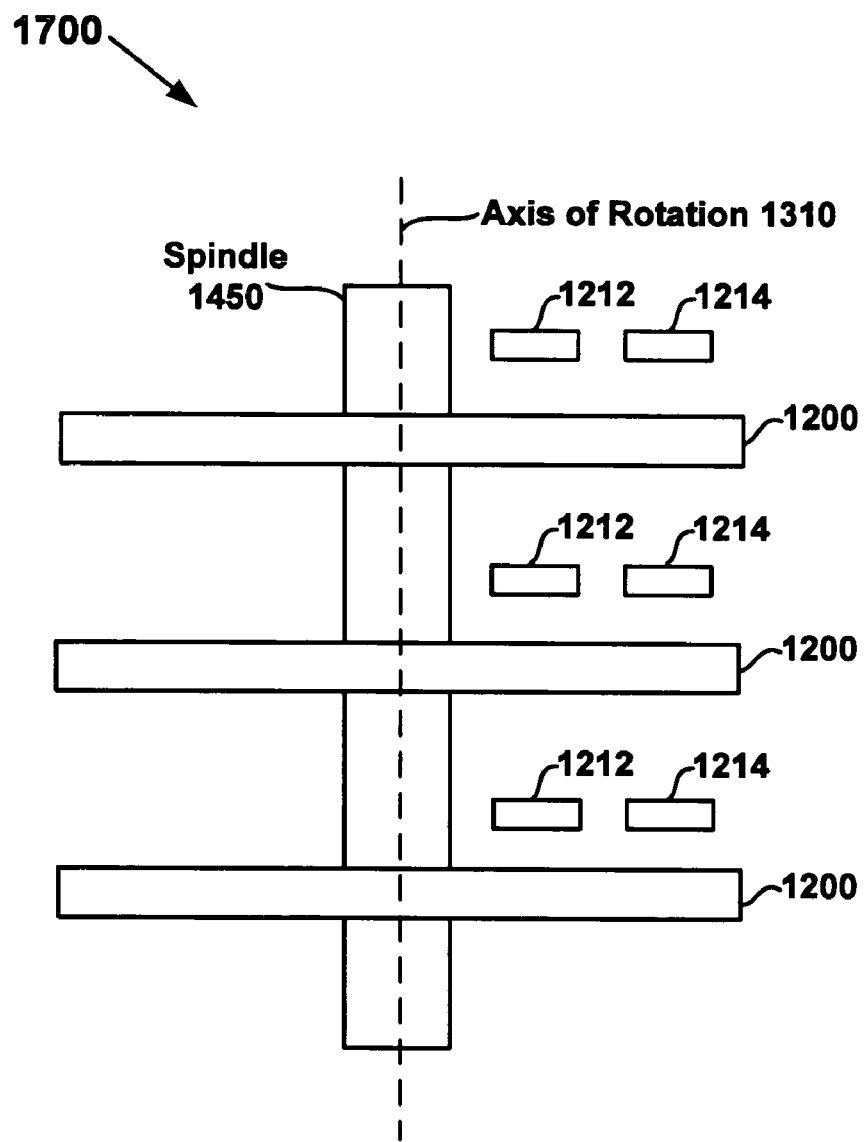
FIG. 17 depicts sensor configurations with respect to a disk drive with multiple disks, according to one embodiment.

Sensors can be configured in many different ways with respect to one or more disks 1200. FIGS. 16A and 16B depict sensors 1212, 1214 configured with respect to a disk 1200, according to one embodiment. As depicted in FIGS. 16A and 16B, both of the sensors 1212, 1214 face the same surface of the disk 1200. Further, according to one embodiment, the sensors 1212, 1214 lie along the same radial line 1610 and are separated by a fixed distance 1630. According to another embodiment, the sensors 1212, 1214 are in relative proximity to the read write head 109. For example, the radial line 1610 the sensors 1212, 1214 are on may be within a 30 degree angle 1662 of a radial line 1620 that the read write head 109 is on. According to yet another embodiment, the angle 1662 maybe 20 degrees or less. According to another embodiment, FIG. 17 depicts a portion of a disk drive 1700 that includes multiple disks 1200. Further, two sensors 1212, 1214 are associated with each of the disks 1200.

Figure 18A:
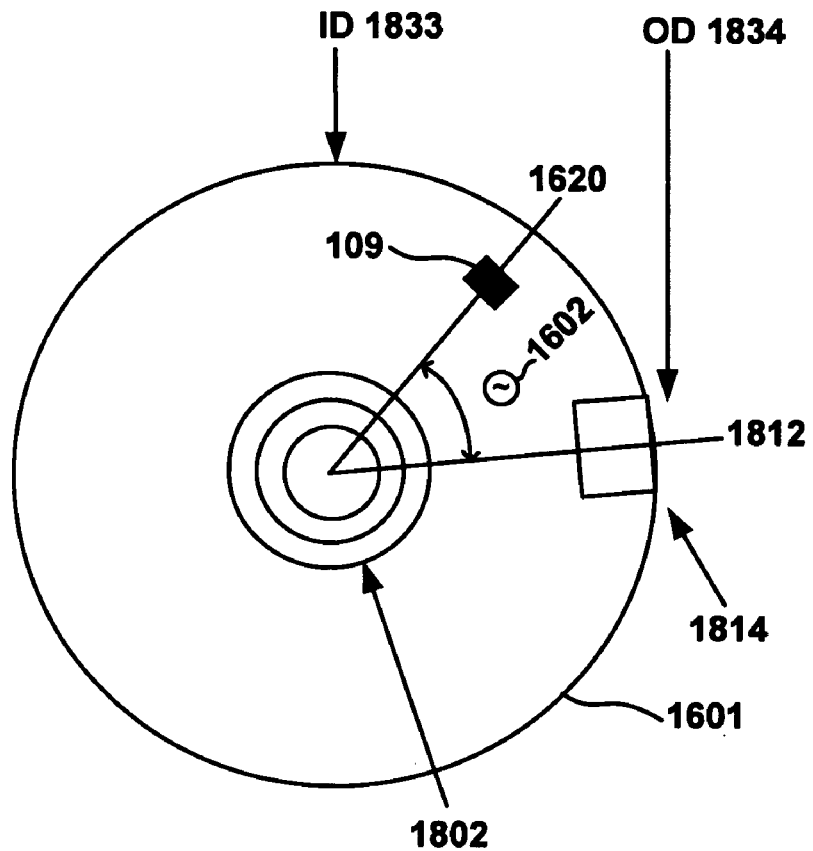
FIGS. 18A and 18B depict sensors oriented with respect to disk(s), according to another embodiment.
Figure 18B:
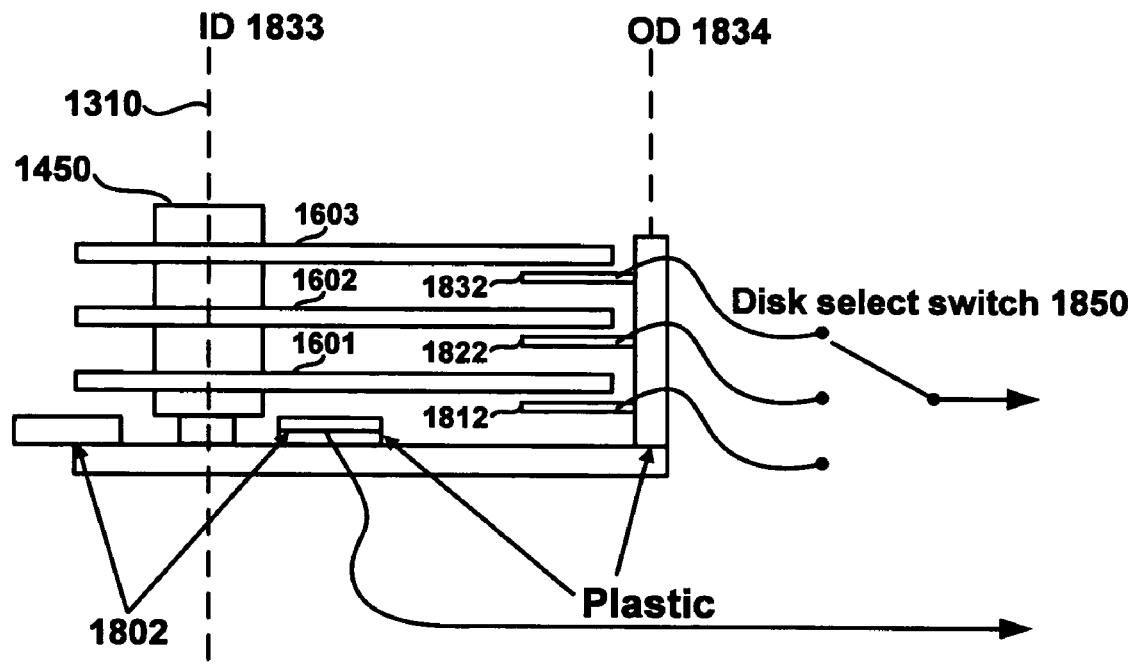

FIGS. 18A and 18B depict sensors oriented with respect to disk(s), according to another embodiment. FIG. 18A depicts a top down view of a disk drive and FIG. 18B depicts a side view of the disk drive. One of sensors 1812, 1822, 1832 may be associated with each disk 1200, for example, in proximity to the outer diameter 1834 of the disk drive. Another sensor 1802 may be in proximity to the inner diameter 1833 of the disk drive, for example near the disk drive's spindle 1450. According to one embodiment, all sensors 1802, 1812, 1822, 1832 face the same side of the disks 1601, 1602, 1603. For example, as depicted in FIG. 18B, all of the sensors face the underneath side of the disks 1601-1603.

Since disk vibration is typically minimal when near a disk drive's spindle 1450, all of the sensors 1212 that are nearest the inner diameter of the disk drive 1700 as depicted in FIG. 17 are not required, according to one embodiment. For example, the distance between the sensor 1802 and disk 1601's surface can be compared to the distance between sensor 1832 and disk 1603's surface to determine whether disk 1603 is tilting or whether the disk 1603 is moving along the axis of rotation 1310.

Similarly, the distance between the sensor 1802 and disk 1601's surface can be compared to the distance between sensor 1822 and disk 1602's surface to determine whether disk 1602 is tilting or whether the disk 1602 is moving along the axis of rotation 1310. Similar process can be performed to determine whether disk 1601 is tilting or moving along the axis of rotation 1310.

According to one embodiment, a disk selection switch 1850 can be used for selecting a disk from among disks 1601-1603. For example, at one point in time the selection switch 1850 may be used to indicate that the distance between sensor 1832 and disk 1603 is to be determined. At another point in time the selection switch 1850 may be used to indicate that the distance between sensor 1812 and disk 1601 is to be determined.

Figure 19:
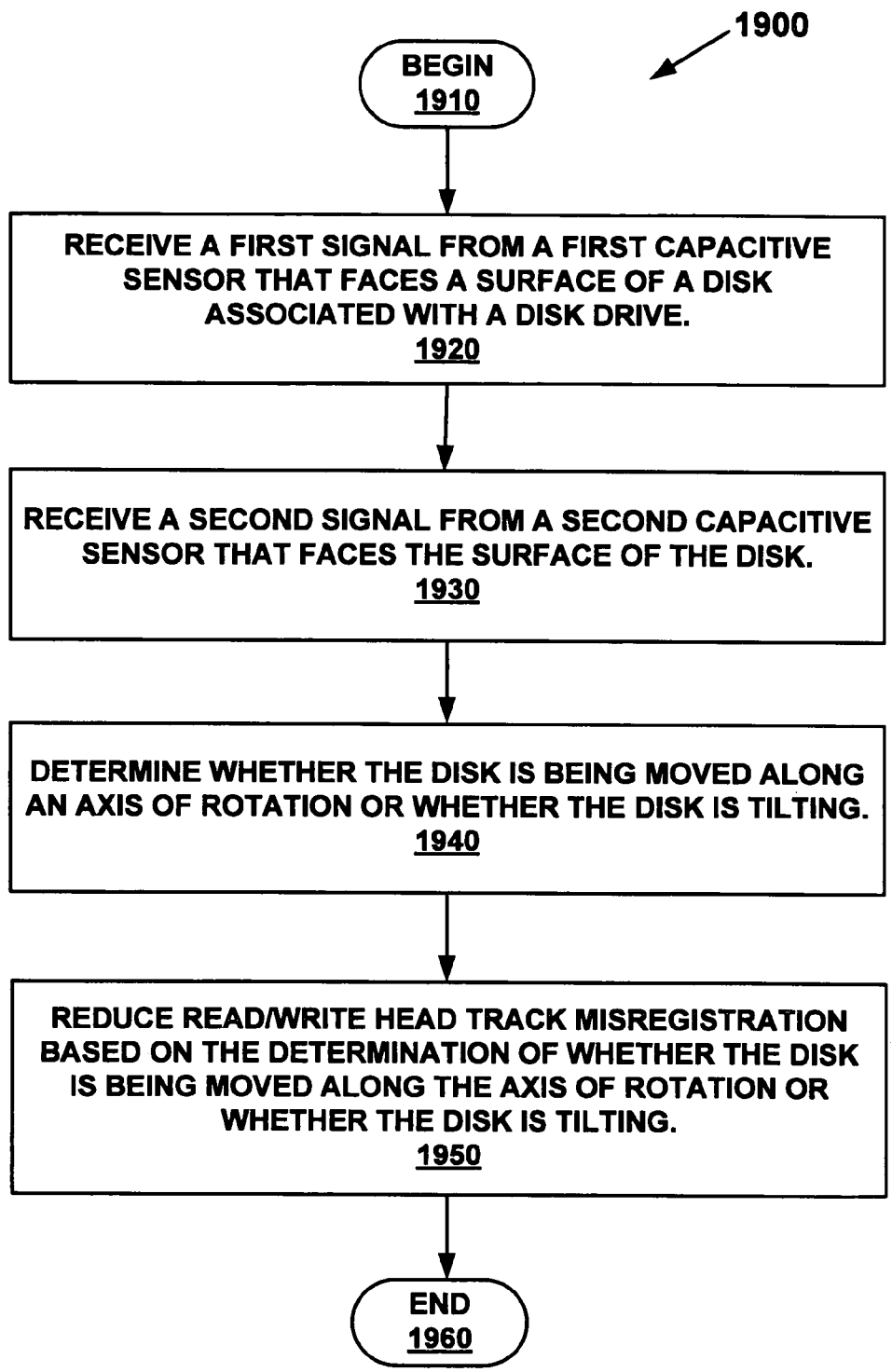
FIG. 19 depicts a flowchart for a method of reducing read/write head track misregistration, according to one embodiment.

FIG. 19 depicts a flowchart for a method of reducing read/write head track misregistration, according to one embodiment. Although specific steps are disclosed in flowchart 1900, such steps are exemplary. That is, embodiments of the present invention are well suited to performing various other steps or variations of the steps recited in flowchart 1900. It is appreciated that the steps in flowchart 1900 may be performed in an order different than presented, and that not all of the steps in flowchart 1900 may be performed. All of, or a portion of, the embodiments described by flowchart 1900 can be implemented using computer-readable and computer-executable instructions which reside, for example, in computer-usable media of a computer system or like device.

In step 1910, the method begins.

In step 1920, a first signal from a first capacitive sensor that faces a surface of a disk associated with a disk drive is received. For example, sensor 1212 faces the surface 1202 of disk 1200 (FIG. 13). The capacitance sensing circuit 1320 can receive a signal from sensor 1212 indicating the distance 1312 between sensor 1212 and the disk 1200's surface 1202.

In step 1930, a second signal from a second capacitive sensor that faces the surface of the disk is received. For example, sensor 1214 faces the surface 1202 of disk 1200 (FIG. 13). The capacitance sensing circuit 1320 can receive a signal from sensor 1214 indicating the distance 1314 between sensor 1214 and the disk 1200's surface 1202.

In step 1940, a determination is made as to whether the disk is being moved along an axis of rotation or whether the disk is tilting. For example, the capacitance sensing circuit 1320 receives signals from the sensors 1212, 1214 indicating the respective distance 1312, 1314 between the sensors 1212, 1214 and the disk 1200's surface 1202 in steps 1920 and 1930. Distances 1312, 1314 between the sensors 1212, 1214 and the disk 1200's surface 1202 that are approximately the same indicate that the disk 1200 is being moved along its axis of rotation 1310. Distances 1312, 1314 that are different indicate that the disk 1200 is tilting. The capacitance sensing circuit 1320 can use the two signals to determine whether the disk 1200 is moving along its axis of rotation 1310 or whether the disk 1200 is tilting. The capacitance sensing circuit can generate a movement signal 1440 representative of movement of the disk 1200 along its axis of rotation 1310 and representative of tilting movement of the disk 1200. Refer to the description of FIG. 14 for more information on how a capacitance sensing circuit can be used to determine whether the disk is being moved along its axis of rotation or whether the disk is tilting.

In step 1950, read/write head track misregistration is reduced based on the determination of whether the disk drive is being moved along its axis of rotation or whether the disk 1200 is tilting. For example, a feedback controller 1340 is responsive to position information detected by the head 109 and can generate a head position control signal. The feedforward controller 1330 in response to the movement signal 1440 can generate a correction signal. The movement signal 1440 was generated in step 1940, according to one embodiment, based on the determination of whether the disk is being moved along its axis of rotation or whether the disk is tilting. An actuator control signal can be generated based on a combination of the correction signal and the head position control signal generated by the feedback controller 1340.

In step 1960, the method stops.

Other attempts have been made to reduce the effects of a disk being moved for example along its axis of rotation or tilting due to vibration. For example, conventional methods have included making the disk drive stiffer. However, there is limited space inside of a disk drive and making the disk drive stiffer typically further limits the space. Another example of a conventional method involves improving the flow of air inside of a disk to reduce disk vibration. However, this increases the cost of producing a disk drive. Neither of these conventional methods can be used for determining whether a disk is being moved along its axis of rotation or is tilting. Further, various embodiments of the present invention provide a cost effective way of determining whether a disk is being moved along its axis of rotation or is tilting. The determination can be used as a part of reducing read/write head track misregistration.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A system for reducing read/write head track misregistration, the system comprising:
- a feedback controller responsive to position information detected by a head associated with a disk drive for generating a head position control signal;
- a first capacitive sensor and a second capacitive sensor, wherein the capacitive sensors face a surface of a disk associated with the disk drive and enables determining distances between the surface of the disk and the respective capacitive sensors;
- a capacitance sensing circuit coupled to the first and second capacitive sensors, wherein the capacitance sensing circuit generates a movement signal representative of movement of the disk along an axis of rotation and representative of tilting movement of the disk; and
- a feedforward controller responsive to the movement signal for generating a correction signal, the correction signal being combined with the head position control signal to generate an actuator control signal.

2. The system of claim 1, wherein the movement signal is generated by differentiating between the movement of the disk along the axis of rotation and the tilting movement of the disk is enabled by the first and second capacitive sensors in combination with the capacitance sensing circuit.

3. The system of claim 1, wherein movement of the disk along the axis of rotation is indicated by the distances being approximately the same and tilting movement of the disk is indicated by the distances being different.

4. The system of claim 1, wherein the first capacitive sensor is located proximate to an inner diameter of the disk and the second capacitive sensor is located proximate to an outer diameter of the disk.

5. The system of claim 4, wherein the first and second capacitive sensors are separated by a fixed distance.

6. The system of claim 1, wherein the first and second capacitive sensors are associated with the same radial line.

7. The system of claim 1, wherein the first and second capacitive sensors are within a 30 degree radius of the head.

8. The system of claim 1, wherein the first and second capacitive sensors face the same side of the disk.

9. The system of claim 1, wherein the system is associated with a disk drive that has multiple disks and the system is capable of determining for each disk whether the disks are moving along the axis of rotation or whether the disks are tilting.

10. A disk drive that is capable of distinguishing between a disk being moved along an axis of rotation and the disk tilting, the disk drive comprising:
- a disk for recording data to;
- a feedback controller responsive to position information detected by a head for generating a head position control signal;
- a first capacitive sensor and a second capacitive sensor, wherein the capacitive sensors face a surface of the disk associated with a disk drive and enables determining distances between the surface of the disk and the respective capacitive sensors;
- a capacitance sensing circuit coupled to the first and second capacitive sensors, wherein the capacitance sensing circuit generates a movement signal representative of movement of the disk along an axis of rotation and representative of tilting movement of the disk; and
- a feedforward controller responsive to the movement signal for generating a correction signal, the correction signal being combined with the head position control signal to generate an actuator control signal.

11. The disk drive of claim 10, wherein the disk drive includes multiple disks and wherein at least two capacitive sensors are associated with each of the disks for determining whether each of the disks are tilting or moving along the axis of rotation.

12. The disk drive of claim 10, wherein the disk drive includes multiple disks, a respective capacitive sensor is associated with each of the disks proximate to an outer diameter of the disk drive and wherein an additional sensor is associated with the disk drive proximately to an inner diameter of the disk drive.

13. The disk drive of claim 12, wherein the capacitive sensing circuit compares a distance between the additional sensor and a surface of a first disk to a distance between a second sensor proximately to the outer diameter of a second disk to determine whether the second disk is tilting or whether the second disk is moving along the axis of rotation.

14. The disk drive of claim 10, wherein the generation of the movement signal is enabled by the first and second capacitive sensors in combination with the capacitive sensing circuit.

15. The disk drive of claim 10, wherein movement of the disk along the axis of rotation is indicated by the distances being approximately the same and tilting movement of the disk is indicated by the distances being different.

16. The disk drive of claim 10, wherein the first capacitive sensor is located proximate to an inner diameter of the disk and the second capacitive sensor is located proximate to an outer diameter of the disk.

17. The disk drive of claim 16, wherein the first and second capacitive sensors are separated by a fixed distance.

18. A method of reducing read/write head track misregistration, the method comprising:
- receiving a first signal from a first capacitive sensor that faces a surface of a disk associated with a disk drive;
- receiving a second signal from a second capacitive sensor that faces the surface of the disk;
- determining whether the disk is being moved along an axis of rotation or whether the disk is tilting; and
- reducing read/write head track misregistration based on the determining of whether the disk drive is being moved along the axis of rotation or whether the disk is tilting.

19. The method as recited in claim 18, wherein the determining whether the disk is being moved along the axis of rotation or whether the disk is tilting further comprises:
- generating a movement signal by differentiating between whether the disk is being moved along the axis of rotation or whether the disk is tilting.

20. The method as recited in claim 19, wherein the differentiating between whether the disk is being moved along the axis of rotation or whether the disk is tilting further comprises:
- using the first and second capacitive sensors in combination with the capacitive sensing circuit to enable the differentiating.

* * * * *